United States Patent
Storm et al.

(10) Patent No.: US 11,030,292 B2
(45) Date of Patent: Jun. 8, 2021

(54) AUTHENTICATION USING SOUND BASED MONITOR DETECTION

(71) Applicant: Advanced New Technologies Co., Ltd., George Town (KY)

(72) Inventors: Gregory Lee Storm, Parkville, MO (US); Reza R. Derakhshani, Shawnee, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 197 days.

(21) Appl. No.: 16/216,811

(22) Filed: Dec. 11, 2018

(65) Prior Publication Data

US 2020/0184054 A1 Jun. 11, 2020

(51) Int. Cl.
*G06F 21/32* (2013.01)
*G06F 3/16* (2006.01)
*G06N 5/04* (2006.01)
*G06N 20/10* (2019.01)
*G06N 3/08* (2006.01)

(52) U.S. Cl.
CPC .......... *G06F 21/32* (2013.01); *G06F 3/16* (2013.01); *G06N 3/08* (2013.01); *G06N 5/04* (2013.01); *G06N 20/10* (2019.01)

(58) Field of Classification Search
CPC .. G06F 21/32; G06F 3/16; G06N 5/04; G06N 21/10
See application file for complete search history.

(56) References Cited

U.S. PATENT DOCUMENTS

| 9,665,784 | B2* | 5/2017 | Derakhshani | G01S 15/89 |
| 2014/0068751 | A1* | 3/2014 | Last | H04L 63/083 726/16 |
| 2015/0082404 | A1* | 3/2015 | Goldstein | H04W 4/029 726/7 |
| 2016/0140405 | A1* | 5/2016 | Graumann | G06K 9/00288 382/118 |
| 2016/0366654 | A1* | 12/2016 | Dervisoglu | H04W 52/246 |
| 2018/0047394 | A1* | 2/2018 | Tian | G10L 17/06 |

OTHER PUBLICATIONS

"Face Biometric Antispoofing"—Correya et al, Department of CSE, BMS IT&M, IJARCCE, Vo. 7, Issue 3, Mar. 2018 https://ijarcce.com/upload/2018/march-18/IJARCCE%2010.pdf (Year: 2018).*
Genkin et al., "Synesthesia: Detecting Screen Content via Remote Acoustic Side Channels," Cornell University, Aug. 21, 2018, arXiv:18092629, 31 pages.

* cited by examiner

*Primary Examiner* — Randy A Scott
(74) *Attorney, Agent, or Firm* — Fish & Richardson P.C.

(57) ABSTRACT

Techniques are described for authentication using sound-based monitor detection. In some implementations, the sound (e.g., ultrasound) generated by a monitor is used to detect its presence in the vicinity of a (e.g., portable) computing device that is being used to capture image(s) to be provided to an image-based authentication system. While the computing device is being used to capture image(s) to be provided to the image-based authentication system, the sound data in proximity to the computing device can be captured and analyzed (e.g., using machine learning or other techniques) to determine whether the sound data exhibits a particular pattern and/or characteristics (e.g., signature) that indicates the presence of a monitor in proximity to the computing device. The presence (or absence) of a monitor can be used in determining whether to authenticate the user.

18 Claims, 5 Drawing Sheets

AUTHENTICATION USING SOUND BASED MONITOR DETECTION

BACKGROUND

Various types of software applications enable users to access information and/or perform actions that may affect the state of a local or remote computing system. In some examples, an application may include authentication and authorization features to verify the identity of the user and ensure that the user is authorized to access information and/or perform actions through the application. For example, an application may prompt a user to enter credential(s) such as a username, password, personal identification number (PIN), and so forth, and such credential(s) may be compared to previously established credential(s) to verify the user's identity and/or authorization. In some examples, biometric data may be used in addition to or instead of user-entered credential(s), to attempt to verify the user's identity based on one or more of their physiological characteristics. Previously available methods for authenticating a user have been vulnerable to different types of exploits, given the strong incentives for malicious individuals to attempt unauthorized access, for example to view confidential information or commit fraud.

SUMMARY

Implementations of the present disclosure are generally directed to user authentication in computing systems. More particularly, implementations of the present disclosure are directed to analyzing captured sound data (e.g., in an ultrasonic frequency range) to determine a probability that a computer monitor is present when a user is requesting authentication through an image-based authentication mode (e.g., facial recognition based authentication), and determining whether the user is authenticated based at least partly on the determined probability that a monitor is present. Implementations may operate to prevent or reduce the success rate of a spoofing attack in which a malicious individual attempts to spoof the identity of an authorized user, and fool an image-based authentication system (e.g., facial recognition), by capturing an image of the authorized user that is being presented on a (e.g., high resolution) monitor and present that captured image to the authentication system as if it were the malicious individual's own image.

In general, innovative aspects of the subject matter described in this specification can be embodied in methods that include the following operations: accessing sound data that is generated by at least one microphone of a computing device, the sound data describing sound that is detected by the at least one microphone during an attempted authentication of a user of the computing device through an image-based authentication system; analyzing the sound data to generate prediction information that describes a probability that a monitor is operating in proximity to the computing device during the attempted authentication; and determining a result of the attempted authentication based at least partly on the prediction information.

These and other implementations can each optionally include one or more of the following features: the sound data is in an ultrasonic frequency range; generating the sound data includes adjusting a sampling rate of the at least one microphone; the operations further include activating the at least one microphone in response to the attempted authentication; the prediction information describes the probability that the monitor is operating within a threshold distance of the computing device during the attempted authentication; the result is a failure of the attempted authentication based on the probability being at least the threshold probability that the monitor is operating in proximity to the computing device during the attempted authentication; the prediction information includes a binary indication of whether the monitor is operating in proximity to the computing device; analyzing the sound data to generate the prediction information includes providing at least a portion of the sound data as input to at least one classifier that is trained, using at least one machine learning (ML) algorithm, to output the prediction information based on the input sound data; the at least one classifier includes one or more of a neural network, a recurrent neural network (RNN), a long short-term memory (LSTM) network, and a support vector machine (SVM); and/or the at least one classifier includes multiple classifiers that are each trained to predict proximity of a respective type of monitor.

These and other implementations can provide one or more of the following technical advantages and/or technical improvements compared to traditional authentication techniques. By employing sound-based monitor detection during the authentication of a user, implementations can prevent an unauthorized user from successfully performing a spoof attack on an image-based authentication system (e.g., for face, eye, or body recognition), by displaying a still image of a user on a monitor, capturing the still image with a camera of another device, and providing the captured still image as if it were a live image of the legitimate, authorized user. In this way, implementations improve the operation of a computing system that performs user authentication and/or authorization operations, by providing a more reliable technique for authenticating a user and hardening the computing system against spoofing attacks.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
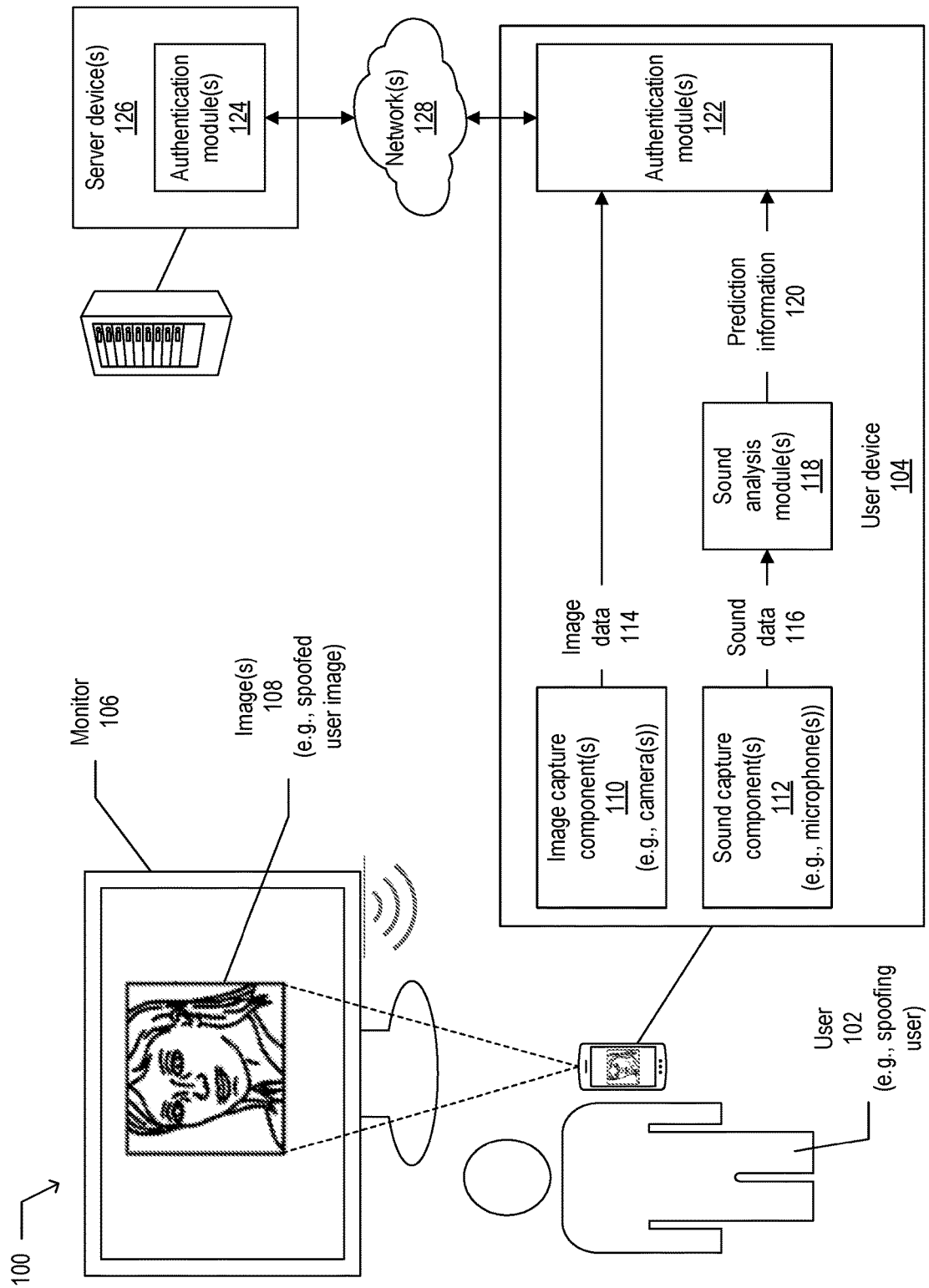
FIG. 1 depicts an example system for user authentication, according to implementations of the present disclosure.

Implementations of the present disclosure are directed to systems, devices, methods, and computer-readable media for user authentication using sound-based monitor detection. In some implementations, the (e.g., ultrasonic frequency) sound created by a monitor is used to detect its presence in the vicinity of a (e.g., portable) computing device that is being used to capture image(s) to be provided to an image-based authentication system. During its normal operation, a monitor refreshes pixel(s) on its display screen at a high frequency (e.g., 60 hertz), and such action(s) can cause the monitor to emit sound in an ultrasonic frequency range. While the computing device is being used to capture image(s) to be provided to the image-based authentication system, the sound data in proximity to the computing device can be captured and analyzed to determine whether the sound data exhibits a particular pattern and/or characteristics (also described herein as a signature) that indicates the presence of a monitor in proximity to the computing device. In some implementations, the sound data can be analyzed to determine whether a monitor is in a particular location with respect to the computing device (e.g., in front of the computing device) and/or within a predetermined threshold distance away from the computing device, indicating that a spoofing user may be using the computing device to capture an image of the monitor's display, which may be showing an image of the authorized user that the spoofing user is attempting to spoof.

Implementations can analyze the sound data, using suitable machine learning (ML) or other technique(s), to determine a probability that a monitor is nearby and/or in a position relative to the computing device (e.g., in the capture space of the device) to be used in such a spoofing attack. For example, the probability can be determined based on the sound signal strength, direction of the sound, frequency characteristics of the sound (e.g., a particular frequency distribution), and/or other characteristics of the sound. Based at least partly on the determined probability, an attempted authentication using an image-based authentication system can be allowed or blocked. For example, if the probability is at least a predetermined threshold value, the authentication attempt can be denied, based on the inference that the presence of a monitor may indicate a spoofing attack is underway. In this way, implementations can provide a defense against spoofing attacks.

An image-based authentication system may be any suitable system that attempts to verify the identify of a user based on image(s) (e.g., still image(s) and/or video) of the user, such as image(s) of the user's face, eye(s), whole body, and/or other portion(s) of the body. For example an image-based authentication may include capturing an image of the user's face and comparing certain points on the face image (e.g., location of eyes, mouth, nose, etc.), and/or the image as a whole, with previously gathered information regarding the user, to determine whether the image is actually that of the user. Image-based authentication can be used to secure access to sensitive data, such as financial information, health information, and/or other information that is to be inaccessible by the general public. The authentication can also be used to secure access to an application or service that would enable a user to request transactions (e.g., funds transfers, purchases, etc.). Accordingly, implementations described herein help strengthen an image-based authentication system and prevent sensitive data from being accessed by unauthorized individuals, and/or prevent fraud, theft, or other malicious acts.

FIG. 1 depicts an example system 100 for user authentication, according to implementations of the present disclosure. In the example of FIG. 1, a user 102 is employing a user device 104 to request an image-based authentication. In this example, the user 102 is a spoofing user who, instead of using the device 102 to capture an image of their own face, is using the device 102 to capture image(s) 108 that are being presented on a monitor 106. The image(s) 108 may be still image(s) (or video) of a legitimate, authorized user that the user 102 is attempting to spoof (impersonate). For example, the user 102 may be using the device 104 to gain access to an application that is provided by a financial services business or other organization, and may include features to enable the user 102 to view information regarding financial accounts, investments, or other information. The application may also include features to enable the user 102 to request certain actions such as funds transfers, payments, changes to contact information, and so forth. Accordingly, the user 102 may be attempting to impersonate the authorized user to improperly gain access to the authorized user's sensitive financial information.

The user device 104 may be any suitable type of computing device. In some examples, such as the example of FIG. 1, the user device 104 is a portable (e.g., mobile) computing device such as a smartphone, tablet computer, wearable computer, portable gaming device, and so forth. The user device 104 may also be a less portable type of computing device, such as a desktop computer, laptop computer, smart appliance, Internet of Things (IoT) device, gaming console, and so forth. The user device 104 may also be a computing device that is used or shared by various users. For example, the user device 104 may be an ATM, information kiosk, or other computing device accessible to at least a portion of the public.

The user device 104 may include one or more image capture components 110, such as one or more cameras configured to capture still images, video, or both images and video. The image capture component(s) 110 may generate image data 114 by capturing scenes in the field of view of the component(s) 110. The image data 114 may include any suitable number of images of any suitable size and format. The image data 114 may also include video of any suitable length and format.

The user device 104 may also include one or more sound capture components 112, such as one or more microphones configured to generate sound data 116 describing various sounds in the vicinity of the user device 104. The sound data 116 may be provided in any suitable format.

The image capture component(s) 110 and the sound capture component(s) 112 may include hardware component(s), software component(s), or both hardware and software component(s). For example, the image capture component(s) 110 may include camera hardware such as lenses, focusing mechanisms, shutter mechanisms, light detectors, and so forth, as well as software for image stabilization, movement correction, digital image generation, and so forth. The sound capture component(s) 112 may include microphone hardware to capture the sound, as well as software for controlling the microphone(s) and/or processing the captured sound information.

The sound data 116 can be provided to sound analysis module(s) 118 executing on the user device 104 or elsewhere. The module(s) 118 can perform various operations to analyze the sound data 116 and, based on the analysis, generate prediction information 120. The analysis is described in further detail below. The prediction information 120 can include a determination of whether a monitor 106 is in proximity to the user device 104 based on the sound data 116 collected. In some examples, the prediction information 120 is a binary result indicating either that a monitor 106 is present (e.g., 100% probability of monitor presence) or that a monitor 106 is not present (e.g., 0% probability of monitor presence). In some examples, the prediction information 120 is a probability that a monitor 106 is present (e.g., 70% likelihood). In some examples, the prediction information 120 also includes a confidence metric that indicates degree of confidence in the prediction generated by the module(s) 118. For example, the prediction information 120 can indicate a 70% probability that a monitor is present, with 90% confidence in that probability.

In some implementations, the prediction information 120 and the image data 114 can be provided to authentication module(s) 122 executing on the user device 104. The authentication module(s) 122 can determine whether the user 102 is to be authenticated, based on the image data 114 and the prediction information 120. In some implementations, the image data 114 and/or the prediction information 120 is communicated over one or more networks 128 to server device(s) 126 that are remote from the user device 104, and the determination of the authentication result can be made by authentication module(s) 124 executing on the server device(s) 126. The device(s) 126 may include any suitable number and type of computing device(s). In either scenario, the module(s) 122 and/or 124 can be part of an image-based authentication system that performs operations to authenticate users based on facial recognition, eye recognition (e.g., retinal scan), fingerprint recognition, gait recognition, and/or recognition of other body parts. The prediction information 120 may be taken into account in performing the image-based authentication. In some examples, the authentication module(s) 122 may send the image data 114 to the module(s) 124 for analysis to determine an authentication result based on the image data 114, and the module(s) 124 may return the authentication result to the module(s) 122, which may then allow or deny the requested access based on the result. In some implementations, the sound analysis module(s) 118 may execute on the server device(s) 126, and the user device 104 can transmit at least a portion of the sound data 116 to the server device(s) 126 for analysis.

In some implementations, the prediction information 120 may be used by the authentication module(s) 122 and/or 124 to determine whether the image-based authentication is to be performed based on the image data 114. For example, if the prediction information 120 indicates a probability of monitor presence that is higher than a predetermined threshold value (e.g., at least 80%), the authentication request may be denied without performing the image-based authentication determination. In this way, the prediction information 120 can be used for an initial determination of whether to proceed with the image-based analysis.

In some implementations, the prediction information 120 can be used in conjunction with the image-based analysis to determine authentication, and the result of that analysis may be modified based on the prediction information 120. For example, the image-based analysis may be performed (e.g., by the module(s) 122 and/or 124), with a result that the user's identity is verified with X % confidence. The prediction information 120 can be used to raise (e.g., if a monitor is not present) or lower (e.g., if a monitor is present) that result.

Figure 2:
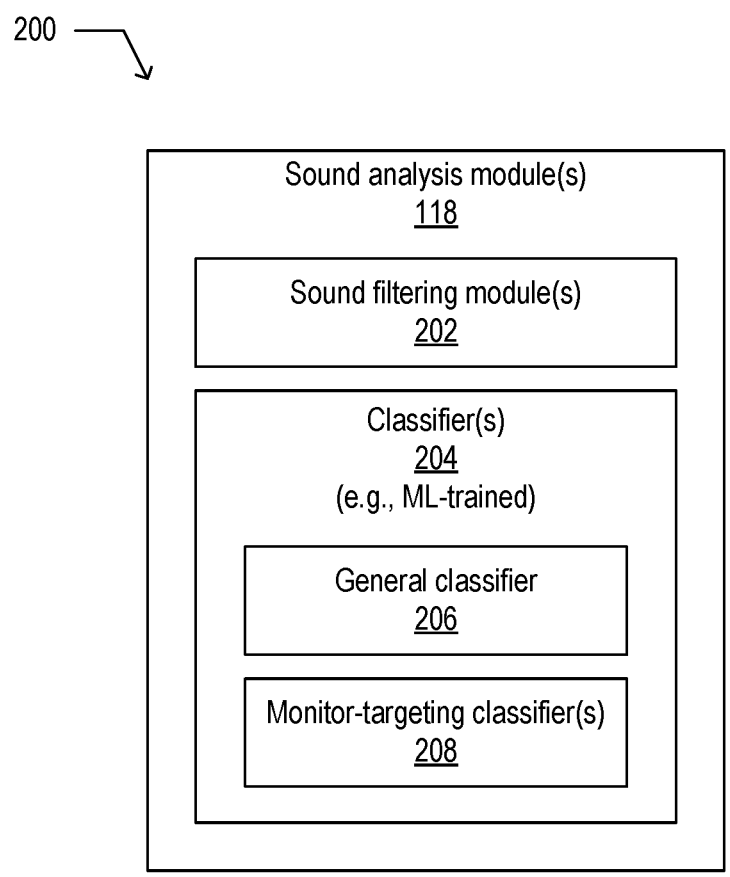
FIG. 2 depicts an example of sound analysis module(s) for user authentication, according to implementations of the present disclosure.

FIG. 2 depicts an example 200 of sound analysis module(s) 118 that may be employed for user authentication, according to implementations of the present disclosure. In some implementations, the module(s) 118 include sound filtering module(s) 202 that filter the sound data 116 prior to further analysis. For example, the filtering may select certain frequency ranges that are relevant for further analysis, filter out transient noises in favor of ongoing and/or repetitive sound, and/or perform other types of filtering.

The sound analysis module(s) 118 can also include one or more classifiers 204 that are trained using suitable ML techniques, as described further herein. The classifier(s) 204 may each generate a prediction of the presence of a monitor 106 in vicinity of the user device 104. In some implementations, a general classifier 206 can be used to predict whether a monitor 106 is present, for (e.g., a wide range of) different types of monitors 106. In some implementations, monitor-targeting classifier(s) 208 can be employed, where each monitor-targeting classifier 208 has been trained to identify the presence of a particular type of monitor. The type of monitor may be a particular brand and/or model of monitor that is produced by a particular manufacturer. The type of monitor may also be a class of monitors that share particular characteristics, such as monitors of a particular size or configuration, monitors that use battery power or plug into an electrical outlet, and/or monitors that employ particular display technologies such as liquid crystal display (LCD), light-emitting diode (LED), organic LED (OLED), and so forth.

In some implementations, classifiers are trained or otherwise developed to determine a characteristic (e.g., ultrasonic) sound signature that is exhibited by one or more monitors during their operation, the classifiers can then make a prediction of whether a monitor is present by "listening for" such a sound signature in the collected sound data. Given that monitor(s) emit sound in an ultrasonic frequency range, the classifier(s) may be trained to detect signatures within that frequency range. As used herein, sound in an ultrasonic frequency range (e.g., ultrasound) includes sound waves with frequencies higher than a maximum frequency that is typically perceivable by a human, such as higher than 20 kilohertz. The sound data 116 may be filtered prior to being input to the classifier(s), to remove sound data 116 in frequency range(s) that may not be relevant to the classification. The filtering may also remove transient, non-repetitive sounds that are not likely to be caused by a monitor. Repetitive sounds may be selected for, given that such sounds may indicate monitor operations such as switching or refresh operations.

In some implementations, the classifier(s) may take into account the strength and/or direction of sound, to look for monitor(s) that may be close enough to the user device 104 to be useful in an attempted spoofing attack, and/or monitor(s) that are in front of the user device 104 (e.g., in the field of view of the device's front-facing camera). Such analysis may reduce the chance of false positive outputs from the classifier(s), such as the classifier(s) identifying the presence of a monitor that is behind the user 102, in another room, or otherwise not currently usable in a spoofing attack given its location and direction relative to the user device 104. In some implementations, the sound data 116 collected may be raw sound data received directly from the sound capture component(s) 112, to bypass any audio data filtering or other processing that may be performed automatically by the operating system or other processes executing on the user device 104.

In some implementations, aliasing may be performed during the sound data capture to allow the sound capture component(s) 112 (e.g., microphones) to capture the ultrasonic frequency sound data that is used in the classification. For example, a device 104 such as a smartphone may include microphone(s) configured to capture audible sound, and aliasing may be used to increase the sampling rate of the microphones sufficiently high enough to capture sound data in the appropriate ultrasonic frequency range. For example, typical microphone sampling rates in smartphones are 44.1 kilohertz or 48 kilohertz, and the sampling rates may be increased to capture the sound data in the desired frequency range.

In some implementations, the frequency range monitored is between 25 kilohertz and 33 kilohertz. This range is above the limit that can typically be directly sampled. For example, with a 48 kilohertz sampling rate, a system could accurately discern a 24 kilohertz signal. As another example, with a 44 kilohertz sampling rate, the limit would be 22 kilohertz. Implementations may look for potential alias frequencies from the base carrier frequencies between 25 and 33 kilohertz, and the actual aliased frequency that is monitored for may vary depending on the sample rate of the device being used. For example, a 44.1 kilohertz sampling rate causes different aliasing than a 48 kilohertz sampling rate. Audible sound is in the range of 20 to 20,000 hertz, and most cell phones can pick up a wider frequency range. A 48 kilohertz sampling rate corresponds to a 24 kilohertz frequency sensitivity.

Figure 3:
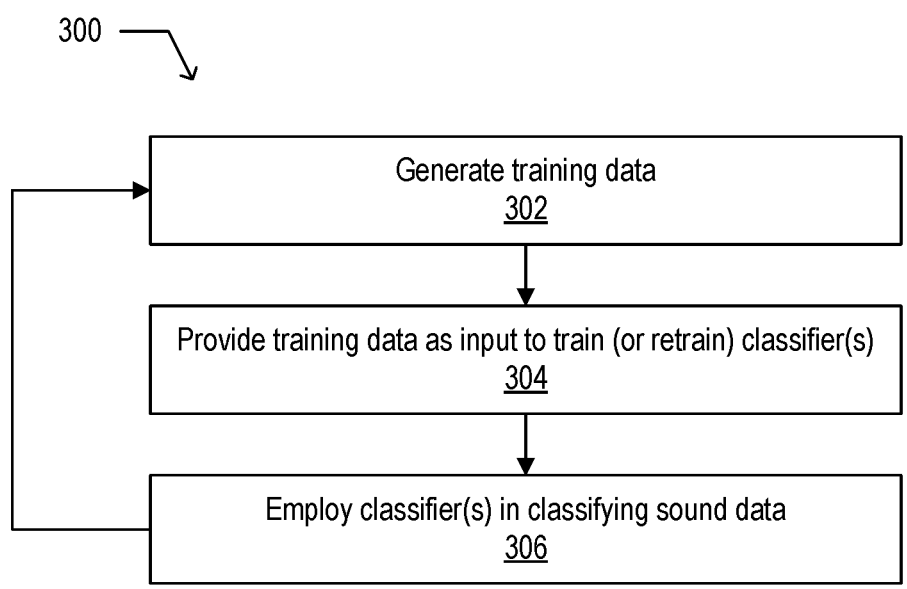
FIG. 3 depicts a flow diagram of an example process for developing classifier(s) for user authentication, according to implementations of the present disclosure.

FIG. 3 depicts a flow diagram 300 of an example process for developing classifier(s) for user authentication, according to implementations of the present disclosure. Operations of the process may be performed by one or more of the sound analysis module(s) 118, the authentication module(s) 122, the authentication module(s) 124, and/or other software module(s) executing on the user device 104, the server device(s) 126, or elsewhere.

In some implementations, training data may be generated (302) and provided as input to train (or retrain) the classifier(s) 204. The classifier(s) 204 can then be employed to classify sound data and generate predictions regarding the presence (or absence) of a monitor in vicinity of the user device 104.

The classifier(s) may be trained to discern particular pattern(s) of the sound data indicate the presence of a monitor, and that originate from a particular location relative to the device 104 (e.g., in front of the device) and/or within a threshold distance of the device 104. The classifier(s) may be trained to detect monitors operating in a variety of circumstance, given that the sound emitted by a monitor may depend on what is currently being presented on the screen. The classifier(s) can also accommodate sounds caused by different behaviors of the monitors, such as sounds caused by a switching power supply as well as sounds caused by the pixel refresh operations. The classifier(s) may be trained based on (e.g., a large amount of) sound data that is collected in a variety of scenarios, as described further below.

Suitable ML techniques may be used to develop the classifier(s). For example, classifier(s) may be developed as a neural network, such as a recurrent neural network (RNN). In some instances, the classifiers may include RNN(s) that employ long short-term memory (LSTM) units for pattern recognition. Such RNN(s) may also be described as LSTM network(s). As another example, the classifier(s) may include support vector machine(s) (SVM(s)), or employ other suitable ML techniques. The classifier(s) may be trained using training data that includes feature vectors that describe sound direction, strength, and frequency, and such training data may be labeled with results (e.g., monitor present, monitor not present). Having been trained, the classifier(s) may predict whether a monitor is present based on input feature vectors. Implementations support retraining of the classifier(s) on a periodic and/or ongoing basis, to refine the operation of the classifier(s) to produce more reliable predictions.

Implementations may employ suitable deep learning techniques, and/or suitable shallow learning techniques. In either case, the training of the classifiers may be data driven. The training may use feature vectors for positive examples, such as staged spoofing attacks with different types of monitors of various sizes and power sources (e.g., battery powered or plugged in), using various technologies (e.g., LCD, OLED, etc.). The training may also use feature vectors for negative examples, in which monitors are being used in a typical or common fashion that is not related to a spoofing attack. In some implementations, the training can use feature vectors for more indeterminate situations, such as examples where sound data is collected in environments where there is a large amount of ambient noise present or transient, loud and sudden (e.g., bang) noises that produce a spike of wide spectrum sound waves, such as the noise of a heavy object being dropped.

The prediction information 120 generated by a classifier can include a binary result (e.g., monitor present or not), a probability of a monitor being present (e.g., 80% likelihood), and/or an indeterminate result indicating that the classifier cannot make a prediction in a particular instance.

In some implementations, a general classifier 206 may be employed that listens for various monitors of different types. A plurality of monitor-targeting classifiers 208 may also be employed, with each trained to listen for a particular monitor (e.g., brand and/or model) or a particular class of monitor having certain size characteristics (e.g., display dimensions), power source characteristics (e.g., battery powered or plugged in), display technology characteristics (e.g., LCD, OLED, etc.), and so forth. When multiple classifiers are employed, each classifier may independently analyze the input feature vector for currently collected sound data 116, and output its own prediction as to whether a monitor is present or not. In some implementations, the highest probability that is output from any of the classifiers can be used to determine the likelihood that a monitor is present. For example, if any of the output probabilities are higher than a threshold probability, the authentication request can be rejected.

In implementations that employ a shallow learning technique, the classifier(s) may be trained using frequency domain features and/or time domain features (e.g., artifacts). Frequency domain features can include spectrogram and/or wavelet decomposition features. In some implementations, a fast Fourier transform (FFT) or other type of suitable algorithm can be used to convert from the time domain to the frequency domain as part of the pre-processing. As part of the processing, implementations may develop a feature set from both time and frequency domains and use that as input to our classifier.

In some examples, based on the capabilities of the user device 104 and/or its operating system, the microphones used may be selected and/or controlled in their operation to collect the sound data. Microphone(s) may also be activated in response to detecting an attempted user authentication using an image-based authentication system. For example, a front-facing microphone may be activated and/or instructed to operate in a directional mode (e.g., to collect data to determine a direction of the source of the detected sound). A microphone may be activated that is pointing in the direction of interest where a monitor is likely to be relative to the user device 104, and used for beam forming and directional filtering to exclude other background sound that may not be relevant to the classification.

Figure 4:
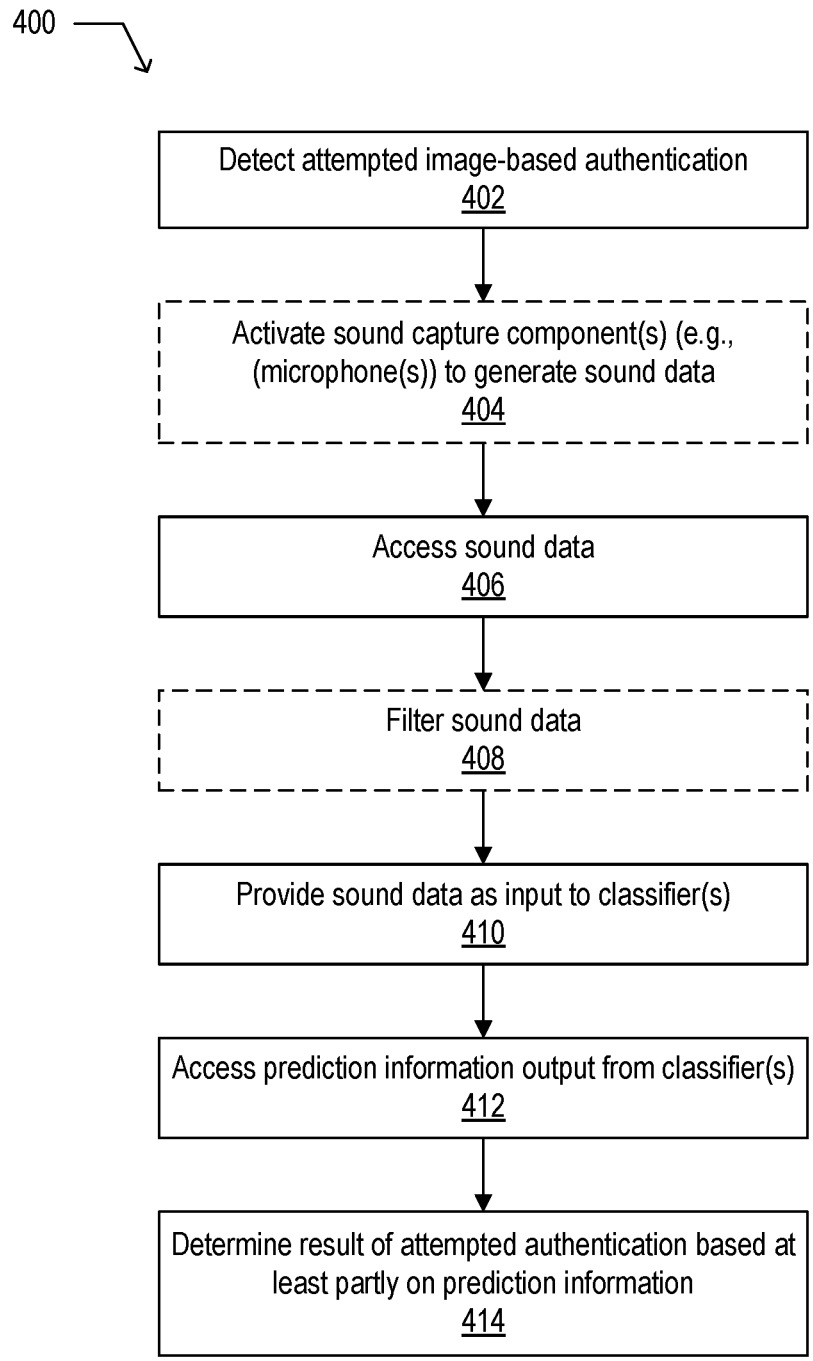
FIG. 4 depicts a flow diagram of an example process for user authentication, according to implementations of the present disclosure.

FIG. 4 depicts a flow diagram 400 of an example process for user authentication, according to implementations of the present disclosure. Operations of the process may be performed by one or more of the sound analysis module(s) 118, the authentication module(s) 122, the authentication module(s) 124, and/or other software module(s) executing on the user device 104, the server device(s) 126, or elsewhere.

In some implementations, an attempted image-based authentication is detected (402), and the process may proceed in response to that event. In some examples, one or more sound capture component(s) (e.g., microphones) are activated (404) on the user device 104, and/or placed in a suitable mode of operation to collect the sound data 116. For example, as described above, microphone(s) may be instructed to operate in a directional mode to acquire sound data 116 from a particular range of directions. The sound data 116 generated is accessed (406) and, in some examples, filtered (408) as described above. The (e.g., filtered) sound data 116 can be provided (410) as input to the classifier(s), which generate prediction information 120 based on the input. The prediction information 120 is accessed (412) and used to determine (414) a result of the attempted image-based authentication of the user 102.

Figure 5:
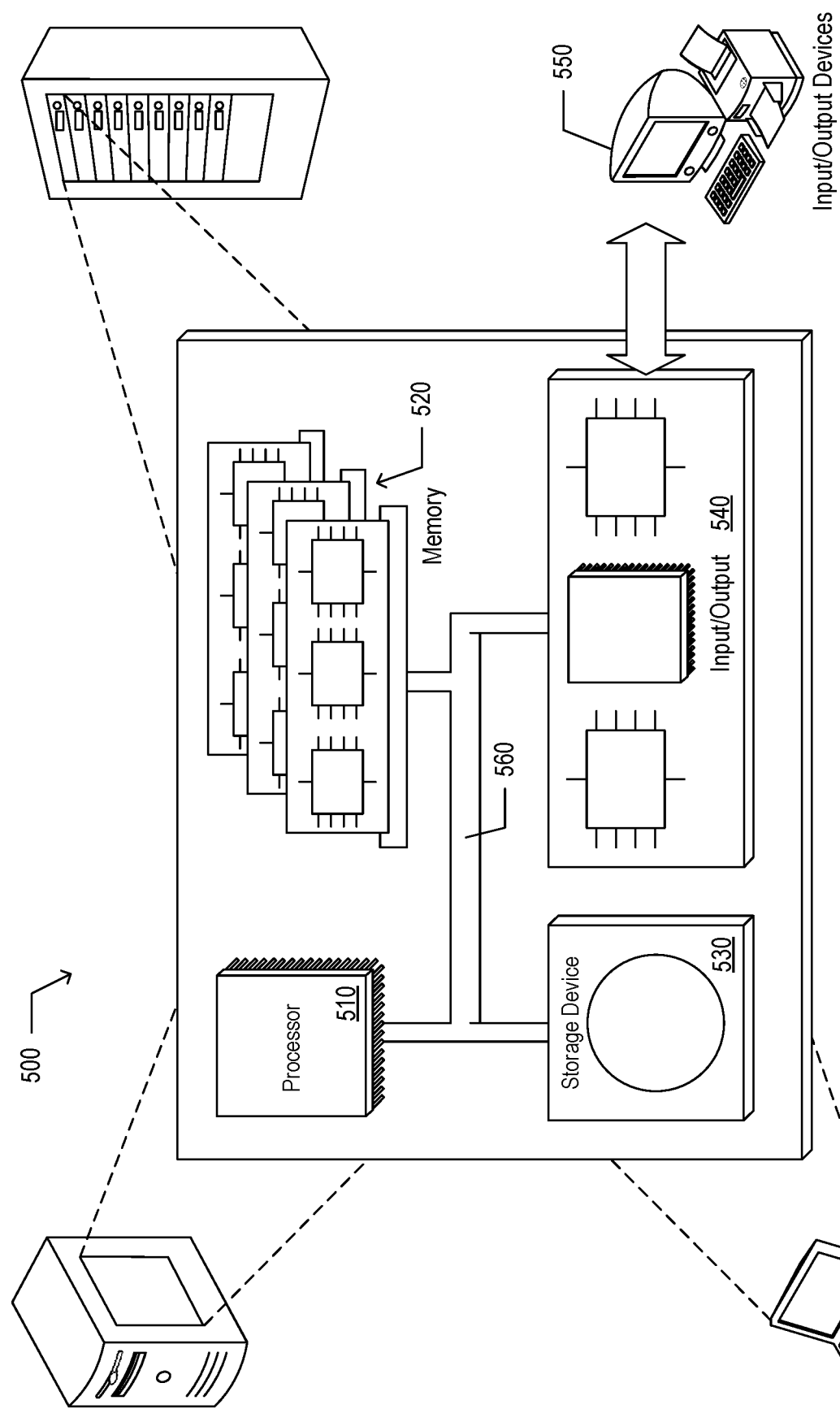
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the user device 104, the server device(s) 126, and/or other computing device(s) and system(s) described herein. The system 500 may include one or more processors 510, a memory 520, one or more storage devices 530, and one or more input/output (I/O) devices 550 controllable via one or more I/O interfaces 540. Two or more of the components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   obtaining, by the at least one processor, an image of a user of a computing device as part of an image-based authentication process of the computing device;
   accessing, by the at least one processor, sound data that is generated by at least one microphone of the computing device, the sound data describing sound that is detected by the at least one microphone;
   generating, by the at least one processor, based on frequency characteristics of the detected sound indicating presence of sound emitted by a display monitor, prediction information that describes a probability that the display monitor is operating in proximity to the computing device during the image-based authentication process;
   determining, by the at least one processor, based on the prediction information, that the image of the user is a spoofed image displayed by the display monitor; and
   determining, by the at least one processor, based on determining that the image of the user is a spoofed image, that the image-based authentication process is to be aborted.

2. The method of claim 1, wherein the sound data is in an ultrasonic frequency range.

3. The method of claim 1, comprising adjusting, by the at least one processor, a sampling rate of the at least one microphone to generate the sound data.

4. The method of claim 1, further comprising:
   activating, by the at least one processor, the at least one microphone in response to the image-based authentication process.

5. The method of claim 1, wherein the prediction information describes a probability that the display monitor is operating within a threshold distance of the computing device during the image-based authentication process.

6. The method of claim 1, wherein the prediction information includes a binary indication of whether the display monitor is operating in proximity to the computing device.

7. The method of claim 1, wherein analyzing the sound data to generate the prediction information includes providing at least a portion of the sound data as input to at least one classifier that is trained, using at least one machine learning (ML) algorithm, to output the prediction information based on the input of at least the portion of the sound data.

8. The method of claim 7, wherein the at least one classifier includes one or more of a neural network, a recurrent neural network (RNN), a long short-term memory (LSTM) network, or a support vector machine (SVM).

9. The method of claim 7, wherein the at least one classifier includes multiple classifiers that are each trained to predict proximity of a respective type of monitor.

10. A system comprising:
    at least one hardware processor, and
    a physical memory communicatively coupled to the at least one processor, the memory storing instructions which, when executed by the at least one processor, cause the at least one processor to perform operations comprising:
    obtaining an image of a user of a computing device as part of an image-based authentication process of the computing device;
    accessing sound data that is generated by at least one microphone of the computing device, the sound data describing sound that is detected by the at least one microphone;
    generating, based on frequency characteristics of the detected sound indicating presence of sound emitted by a display monitor, prediction information that describes a probability that the display monitor is operating in proximity to the computing device during the image-based authentication process;
    determining, based on the prediction information, that the image of the user is a spoofed image displayed by the display monitor; and
    determining, based on determining that the image of the user is a spoofed image, that the image-based authentication process is to be aborted.

11. The system of claim 10, wherein the sound data is in an ultrasonic frequency range.

12. The system of claim 10, wherein the operations comprise adjusting a sampling rate of the at least one microphone to generate the sound data.

13. The system of claim 10, the operations further comprising:
  activating, by the at least one processor, the at least one microphone in response to the image-based authentication process.

14. The system of claim 10, wherein the prediction information describes a probability that the display monitor is operating within a threshold distance of the computing device during the image-based authentication process.

15. The system of claim 10, wherein the prediction information includes a binary indication of whether the display monitor is operating in proximity to the computing device.

16. The system of claim 10, wherein analyzing the sound data to generate the prediction information includes providing at least a portion of the sound data as input to at least one classifier that is trained, using at least one machine learning (ML) algorithm, to output the prediction information based on the input of at least the portion of the sound data.

17. The system of claim 16, wherein the at least one classifier includes multiple classifiers that are each trained to predict proximity of a respective type of monitor.

18. One or more non-transitory, computer-readable storage media storing instructions which, when executed by at least one processor, cause the at least one processor to perform operations comprising:
  obtaining an image of a user of a computing device as part of an image-based authentication process of the computing device;
  accessing sound data that is generated by at least one microphone of the computing device, the sound data describing sound that is detected by the at least one microphone;
  generating, based on frequency characteristics of the detected sound indicating presence of sound emitted by a display monitor, prediction information that describes a probability that the display monitor is operating in proximity to the computing device during the image-based authentication process;
  determining, based on the prediction information, that the image of the user is a spoofed image displayed by the display monitor; and
  determining, based on determining that the image of the user is a spoofed image, that the image-based authentication process is to be aborted.

* * * * *